(12) United States Patent
Benefiel

(10) Patent No.: US 7,121,231 B2
(45) Date of Patent: Oct. 17, 2006

(54) DOGGIE BLANKET COAT

(76) Inventor: Tamara Lynn Benefiel, 8105 Whitmore Cover La., Clemmons, NC (US) 27012

( * ) Notice: Subject to any disclaimer, the term of this patent is extended or adjusted under 35 U.S.C. 154(b) by 11 days.

(21) Appl. No.: 10/877,164

(22) Filed: Jun. 28, 2004

(65) Prior Publication Data

US 2005/0284418 A1    Dec. 29, 2005

(51) Int. Cl.
*A01K 13/00* (2006.01)
*B68C 5/00* (2006.01)

(52) U.S. Cl. ........................... 119/850; 54/79.2

(58) Field of Classification Search ............... 119/850; 54/79.1, 79.2, 79.4; D30/145
See application file for complete search history.

(56) References Cited

U.S. PATENT DOCUMENTS

| | | | | |
|---|---|---|---|---|
| 312,323 | A | * | 2/1885 | Broadhead ............... 54/79.4 |
| 2,131,495 | A | * | 9/1938 | Allen ...................... 54/79.2 |
| D250,138 | S | | 10/1978 | Bartolac et al. |
| D312,151 | S | | 11/1990 | Dickey |
| D313,291 | S | | 12/1990 | Shanley |
| D313,676 | S | * | 1/1991 | Indursky et al. ........... D30/145 |
| D337,864 | S | | 7/1993 | Cullington et al. |
| D372,563 | S | | 8/1996 | Waugh, Jr. |
| D374,315 | S | | 10/1996 | Caditz |
| D379,687 | S | | 6/1997 | Curtis |
| D397,533 | S | | 8/1998 | Lidis |
| D413,186 | S | | 8/1999 | Brown |
| D419,270 | S | * | 1/2000 | Ruscitti .................. D30/145 |
| D427,734 | S | | 7/2000 | Balzarini |
| D444,923 | S | | 7/2001 | Dzamon et al. |
| D457,276 | S | | 5/2002 | Lidis |
| D470,275 | S | | 2/2003 | Lidis |
| 6,539,898 | B1 | * | 4/2003 | Gatto .................... 119/850 |
| 6,584,939 | B1 | | 7/2003 | Brezinski |
| 6,877,300 | B1 | * | 4/2005 | Hathcock ................. 54/79.2 |
| 2003/0221636 | A1 | * | 12/2003 | Critzer ................... 119/850 |

OTHER PUBLICATIONS

Advertisement entitled "Sherpa Lined Fleece Jacket".

* cited by examiner

Primary Examiner—Robert P. Swiatek
(74) Attorney, Agent, or Firm—Robert W. Pitts

(57) ABSTRACT

A dog coat or blanket includes a generally rectangular body section with chest and stomach straps extending from front and side edges respectively. The straps are adjustable so that a few sized will fit most domesticate dog breeds. Both the body section and the straps are two ply construction and the straps both secure the coat to the dog and cover a substantial portion of either the chest or the stomach to limit heat loss. The dog coat can be mounted on a dog from above merely by draping the coat over the dog and attaching the chest and stomach straps.

6 Claims, 6 Drawing Sheets

DOGGIE BLANKET COAT

BACKGROUND OF THE INVENTION

1. Field of the Invention

This invention is related to a coat or covering that can be worn by a four legged animal, such as a dog.

2. Description of the Prior Art

U.S. Design Pat. 313,676 discloses a protective garment for pets, which appears to be intended for use with dogs. Chest straps extend around the dog's chest from opposite sides and lap over each other, where they appear to be attached by hook and loop fasteners. The garment is placed over the dog's back, and front and rear straps extend under the dog's torso and are buckled on an opposite side. One of these straps is adjacent the dog's front legs and the other strap is near the dog's rear legs. The longitudinal position of this garment on a dog appears to be determined by the fore and aft straps extending beneath the dog's torso, since the garment must be placed so as not to restrict movement of the dog's legs. Therefore, this garment does not appear adjustable so that the same garment can be used on dogs of different size. Even though the chest straps may allow minor adjustment, this adjustment would not allow the garment to be shifted longitudinally relative to the dog because of the two straps extending beneath the dog's torso. The length of these two lower straps appears to be adjustable, but this adjustability should only compensate for the girth or weight of the dog. The rear strap also appears to be located so that it could contact a male dog's genitals, which may account for the relatively loose fit illustrated in that disclosure. If the lower straps are indeed loose fitting, they would not help retain heat radiated from the dog's stomach area, and the buckled straps illustrated in that disclosure do not appear suited for insulating the dog's stomach.

There are other prior art dog coats that employ only a single strap or strap assembly extending beneath the stomach. A commercially available Sherpa Lined Fleece Jacket employs a tapered body section extending rearwardly from a single stomach strap subassembly. This jacket has an extra wide chest strap subassembly with a cutout that extend almost to the same longitudinal position as the stomach strap assembly leaving a relatively large opening for the dog's head and neck. This configuration does not appear to provide much room for adjustment and appears to be specifically sized for various standard size dogs, especially smaller dogs.

SUMMARY OF THE INVENTION

According to one aspect of this invention, a coat for a dog includes a rectangular body section having a front edge and a rear edge with longitudinal side edges extending between the front edge and the rear edge. The body section is configured to drape over a dog's torso to cover at least parts of opposite sides of the dog's torso. At least one chest strap extends from the front edge of the body section configured to extend around the dog's chest. Preferably two adjustable and matable chest straps are employed. At least one stomach or lower strap extends from at least one longitudinal side edge of the body section adjacent a central position of the body section. Preferably two adjustable and matable stomach straps extending from opposite sides at of the body section are employed. Each chest strap includes an adjustable attachment member to allow adjustment of the length thereof so that the body section can be adjusted fore and aft on the dog so that each lower or stomach strap can be positioned to be spaced from front and rear legs of the dog so as not to interfere with movement of the dog's legs.

A dog coat according to this invention may include a pair of mutually attachable chest straps extending from the front edge of the body section configured to extend around the dog's chest. A single pair of mutually attachable lower straps would also extend from opposite longitudinal side edges of the body section. These lower straps would extend from adjacent a central position on the longitudinal side edges. The pair of chest straps include adjustable attachment members to allow adjustment of the length of attached chest straps so that the same dog blanket can be adjusted for use on dogs having different size torsos and so that the pair of lower straps can be positioned to be spaced from front and rear legs of the dog so as not to interfere with movement of the dog's legs.

According to another aspect of this invention, such a coat could be lain over a four legged animal's torso and worn by the animal to limit the loss of body heat, This could include a body section formed of two layers of material. At least one chest strap could extend from a front edge of the body section in a position to extend at least partially around the animal's chest beneath the animal's head adjacent the base of the animal's neck for securing the coat to the animal. At least one lower strap would extend from a lower edge of the body section in a position to extend at least partially under the animal's torso to secure the coat to the animal. A first end of each chest strap and a first end of each lower strap is sewn between the two layers forming the body section. The body section has a first seam extending partially around the body section and securing the straps to the body section. The first seam leaves one edge of the body section open so that the body section can be reversed after each chest strap and each lower strap is sewn to the body section so that each chest strap and each lower strap are sewn on the inside of the two layers of the coat when finished. A second seam extends along the edge that was open prior to turning the body section inside out to close the previously open edge.

Not only the body section, but also the straps serve as covering for the dog that can retain warmth, to prevent unnecessary loss of heat from the chest area and the stomach area. The coat is adjustable so that a few sizes can be fabricated to fit a large range of dogs, and five sizes are believed to be sufficient for almost all dogs that serve as house pets. This coat can also be draped over the dogs back, and the straps can be adjusted from above without requiring movement of the dog. Since the straps extend around the dog's chest and stomach, the main body section of the coat need not fold around the dog's torso, limiting the size and conformation of dogs that can wear a coat of a specific size.

DETAILED DESCRIPTION OF THE PREFERRED EMBODIMENT

Figure 1:
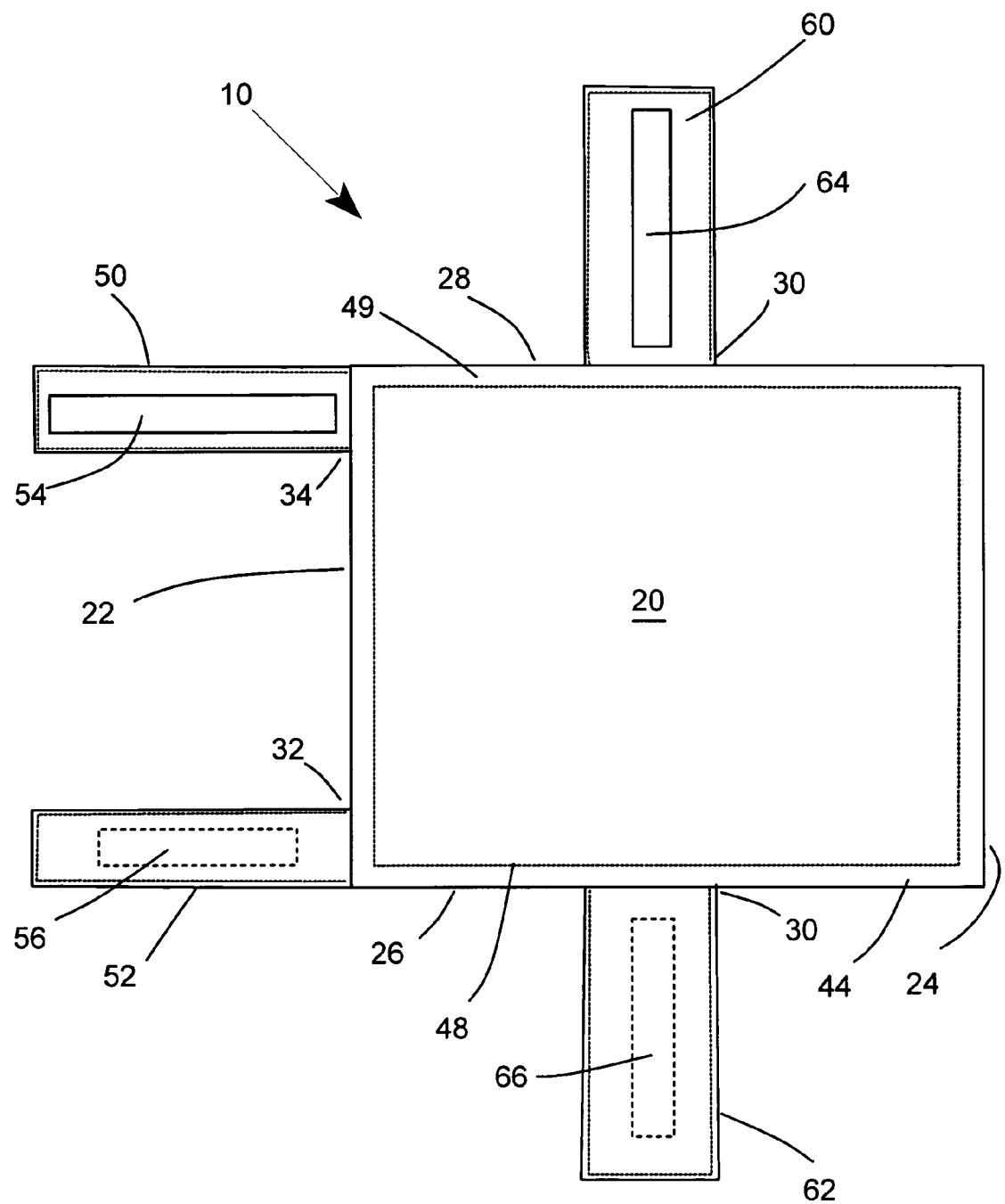
FIG. 1 is a plan view of a coat for use with a dog according to the preferred embodiment of this invention.

The doggie blanket coat 10 is a dog coat made up of five double-ply rectangles. The coat is very easy and inexpensive to manufacture. Because there are no curved edges there is no wasted material. All straight lines make it fast and precise to cut with a roller blade and straight edges are easier and more precise to sew.

There are two steps to constructing the dog coat 10. The first is cutting the fabric and the second is sewing the fabric. When cutting the fabric the material can be cut in more than one layer. Two or more layers are preferred. I will discuss all five rectangles in the cutting and sewing process.

The first section is the main body 20. A first extra small size is cut 12 inches wide and 11 inches long. Wide refers to the lateral direction extending side to side on the dog 2, and long refers to the longitudinal direction extending from the base of the dog's neck towards its tail. Each larger size would add three inches onto each dimension of the body section 20. Five sizes would thus be sufficient for use with the various dog breeds, which are commonly household pets. For example, the body section dimensions for these five sizes according to the preferred embodiment of this invention would be as follows: (extra-small—12"×11"), (small—15"×14"), (medium—18"×17"), (large—21×20) and (extra large—24×23) and etc.

Two of the rectangles make up the chest straps 50, 52. This is the material that covers a dog's chest 7 and overlaps over the chest. Both of these straps 50, 52 are the same size. One goes to the farthest point 34 on the right side of the rectangular main body section 20 and the other goes on the left side 32 of the rectangular main body section 20. Both chest straps 50, 52 are sewn or otherwise secured to the same front edge 22 of the rectangular main body section 20. The dimensions used when cutting fabric to fabricate the chest straps 50, 52 are as follows: (extra-small 3"×7"), (small 3"×8"), (medium 4"×9"), (large 4"×10") and(extra-large 5"×11"). For the chest straps of the preferred embodiment, the length increases one inch for each successively larger size and the width increases one inch for every other size.

Stomach or lower straps 60, 62 are dimensioned as follows: (extra-small 3" wide×7" long), (small 4"×8"), (medium 5"×9"), (large 5"×10") and (extra-large 6"×11"). The length increases one inch for each successively larger size. The width of the stomach straps 60, 62 varies with size, but does not increase in regular increments. The extra-small is 3" wide, the small is 4" wide; the medium is 5" and the large is 5" is also wide while the extra-large is 6" wide. Although these length and width dimensions have proven desirable for the preferred embodiment of this dog coat or doggie blanket coat 10, it should be understood that different dimensions can be used for other embodiments fabricated in accordance with this invention.

The location of the straps on the body of the coat is as follows. The chest straps 50, 52 are sewn on the farthest points 32, 34 on the wide side or front edge 22 of the coat 10, on every size coat. The stomach straps 60, 62 are centrally located laterally on the long edges 26, 28 of the coat body section 20, and are set back from the front edge 22 at central positions 30 by different amounts depending on the size of the coat. The measurements for the set back which is the front edge of the coat body section 20 are as follows. For an X-Small coat the stomach straps 60, 62 on the left and right side of the coat are set back 4" from the front edge. On the small coat it is 5", Med. 6", large 7" and X-Large 8" and so on.

Figure 2:
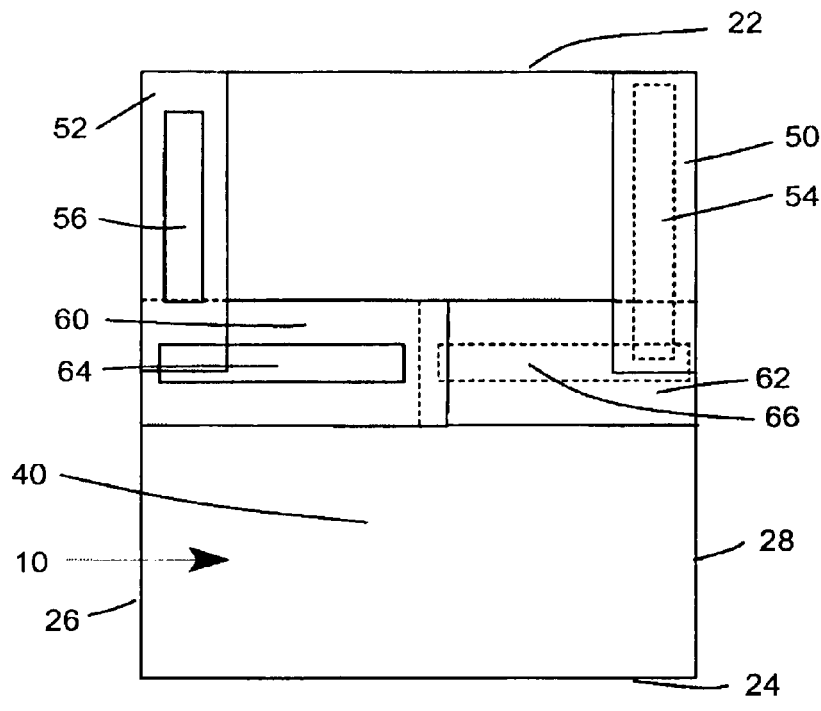
FIG. 2 is a view showing a first step in the construction of the dog coat shown in FIG. 1.
Figure 3:
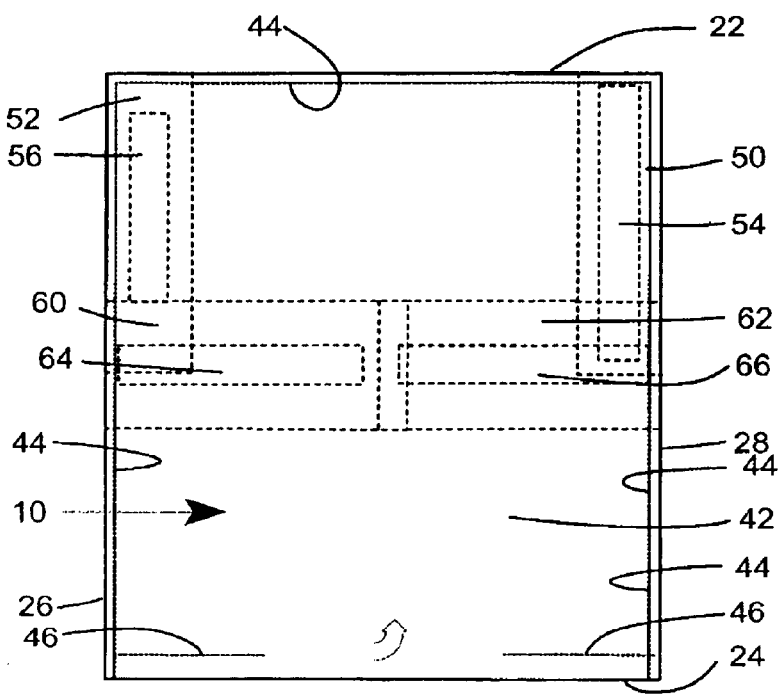
FIG. 3 is a view showing second step in the construction of the dog coat shown in FIGS. 1 and 2.

When sewing the coat, the stomach straps 60, 62 and the chest straps 50, 52 are sewn first. Three of the edges are sewn on both the stomach straps 60, 62 and the chest straps 50, 52 to form a two ply constructon, leaving one of the smaller width sides open. Two of the longer edges and one of the shorter edges are sewn ¼" away from the edge. These are then turned inside out and the same three edges are sewn ½" away from the edge. This gives a cording appearance. The straps 50, 52, 60, 62 are then sandwiched in between the two pieces of fabric forming a n outer layer 40 and an inner layer 42 that make up the body section 20, in the appropriate spots. FIG. 2 shows the straps 50, 52, 60, 62 positioned on top of the outer layer 40, prior to placing the inner layer 42 over the sandwiched straps as shown in FIG. 3. The outer layer 40 and outer layer 42 are then sewn along three edges 22, 26 and 28 to form a first seam 44, which in the preferred embodiment is ¼ inch from the edges. A second seam 46 is sewn partially along the rear edge 24, approximately ¾ inch from the edge 24. A central gap is left between the two sections of seam 46 extending from the gap to opposite corners. Once sewn around the edges the layers are then turned inside out, as shown by the arrow in FIG. 3, so they will be facing the appropriate direction. The initially interior surfaces and the straps are drawn through the gap left by the second seam 46. When turned inside out in this manner, the straps 50, 52, 60, 62 will extend outwardly from the edges 22, 26, and 28. Once turned inside out, a third seam 48 is sewn around all four sides ½" from the edge of the fabric to form a cord section 49 giving the finished fabric coat 10 a cording effect. This third seam will close the gap between sections of second seam 46, and since the seam 46 was originally spaced from the edge by ¾ inch, the third seam 48 will secure the material along rear edge 24. A hidden seam will therefore extend around substantially the entire periphery of the body section and in combination with the cord section 49, the body section will have smooth edges which will not irritate the animal and will not tend to unravel. If the straps are omitted, this same technique can be employed to fabricate a pad or blanket for use by a dog.

The next step in fabrication the coat 10 is the placement of hook and loop fasteners, on to the straps. The loop and hook fasteners can run almost the full length of the straps. A hook fastener strip 54 is attached to one chest strap 50, and one hook fastener strip 64 is attached and preferably sewn on one stomach strap 60 so when placed on the dog 2, the hook fasteners 54, 64 face away from the dogs chest 7 and stomach 8. A loop fastener strip 56 is placed on the chest strap 52, and another loop fastener strip 66 is secured to the stomach strap 62 so when the coat 10 is placed on the dog they fasten appropriately to the corresponding hook fastener strips 54 and 64. The coat can be used as a reversible coat.

The width of the loop and hook fasteners increase in width as the size of the coat increases. An X-Small chest and stomach strap has ¾" loop and hook. The Small coat has 1" on the stomach strap and ¾" on the chest. The Med. has 1" on chest and stomach. The Large coat has 1½" on the stomach and 1" on the chest. The X-Large has 1½" on the chest and stomach.

Figure 4:
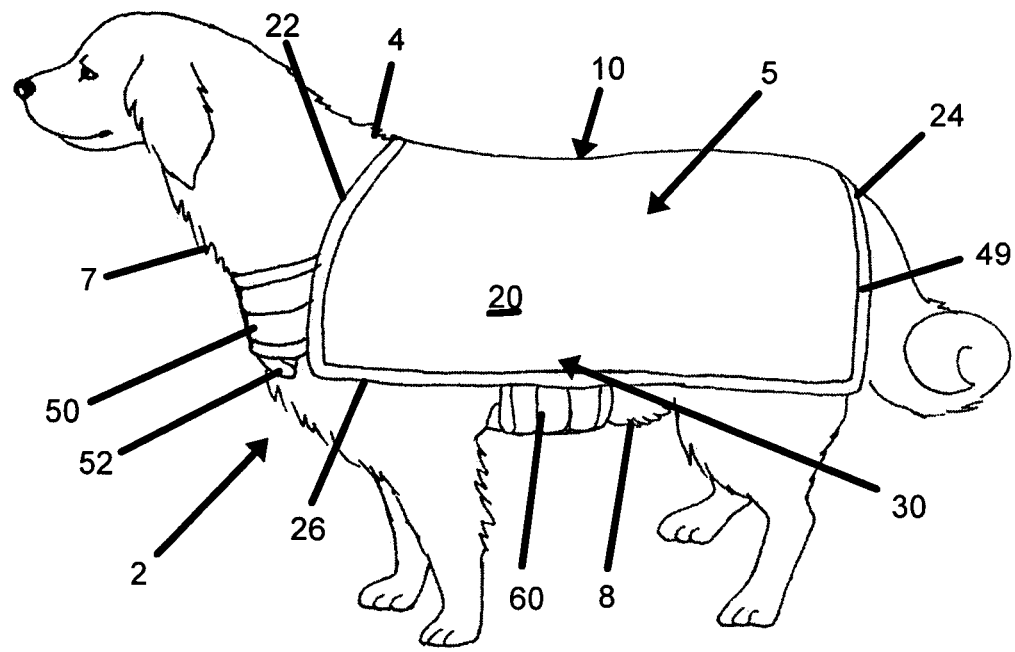
FIG. 4 is a view showing the fit of a first size coat according to this invention on a dog, in this case a golden retriever.

FIG. 4 shows a dog 2, in this case a golden retriever, wearing an X-large coat 10. This particular dog is a relatively heavy set golden retriever. The coat 10 starts at the base of the neck, completely clear of the collar area, and covers the Golden retrievers back and the sides 5 of the dog's torso 4 almost completely to the base of the tail. Stomach straps 60, 62 cover a wide area of the dog's stomach 8 without touching the back of the front legs while also remaining clear of the dog's elimination areas so that the straps 60, 62 will not be soiled. The coat 10 is generally rectangular forming a corner above the top of the right and left rear legs giving extra coverage to provide more warmth without interfering with the dog's movement and without irritation or binding.

The chest straps 50, 52 are sewn low on the coat following the lower edge on the right and left side of the coat 10 to keep the chest straps as low as possible. The chest straps 50, 52 are clear of the collar area and not touching the top of the front legs, but still provide adequate coverage to the chest area 7. Since the coat remains clear of these areas the dog will be relatively unaware of the coat 10. There for the dog will not try to remove the coat, pull at the coat there is no way the dog can step out of the coat. All straps 50, 52, 60, 62 are long enough that no matter what size the dog is they can be secured flush against the dog's body so that there are no baggie areas to irritate the dog. The straps serve not only to attach the coat 10 to the dog 2 in a comfortable manner, but the chest and stomach straps are wide enough to cover large portions of the dog's chest 7 and stomach 8 providing greater protection against the cold.

Figure 5:
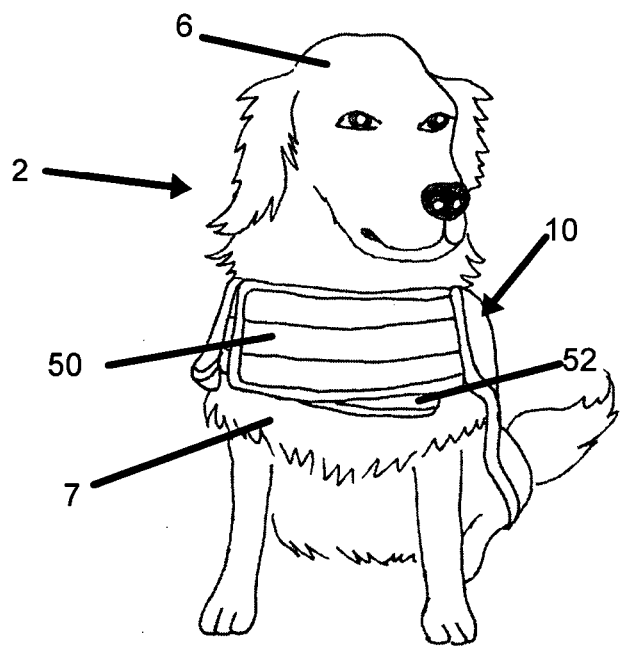
FIG. 5 is a view of the same dog coat as shown in FIG. 3, showing how the coat does not obstruct the same golden retriever while sitting.

In FIG. 5, the same Golden Retriever is wearing the same X-large coat 10. The chest straps 50, 52 are doubled over so that it actually offers quadruple layers for warmth. From this view it can see that there is adequate room for a collar and tags to hang freely in front of the chest straps. 50, 52 The chest straps are still not to close to the top of the legs to interfere with walking. Here the dog is shown in a sitting position demonstrating how the coat 10 will not interfere with normal movement and posture for the dog.

Figure 6:
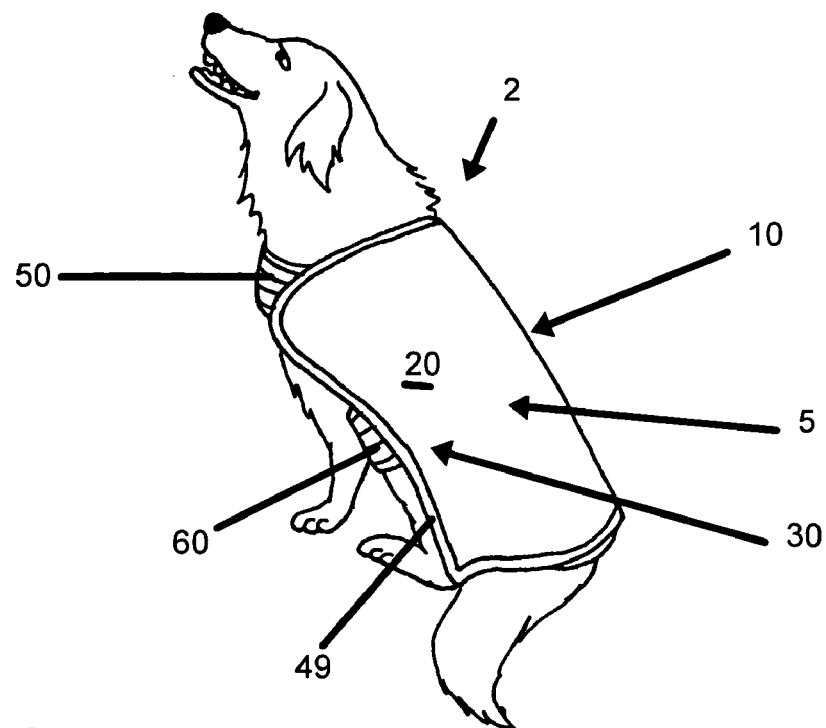
FIG. 6 is a side view showing the same sitting dog, with the same dog coat, as shown in FIG. 4.

In FIG. 6, the same Golden Retriever is shown wearing the same X-large coat 10 and sitting very comfortably. Placement of the straps prevents any pulling, bagginess or anything that might irritate the dog.

Figure 7:
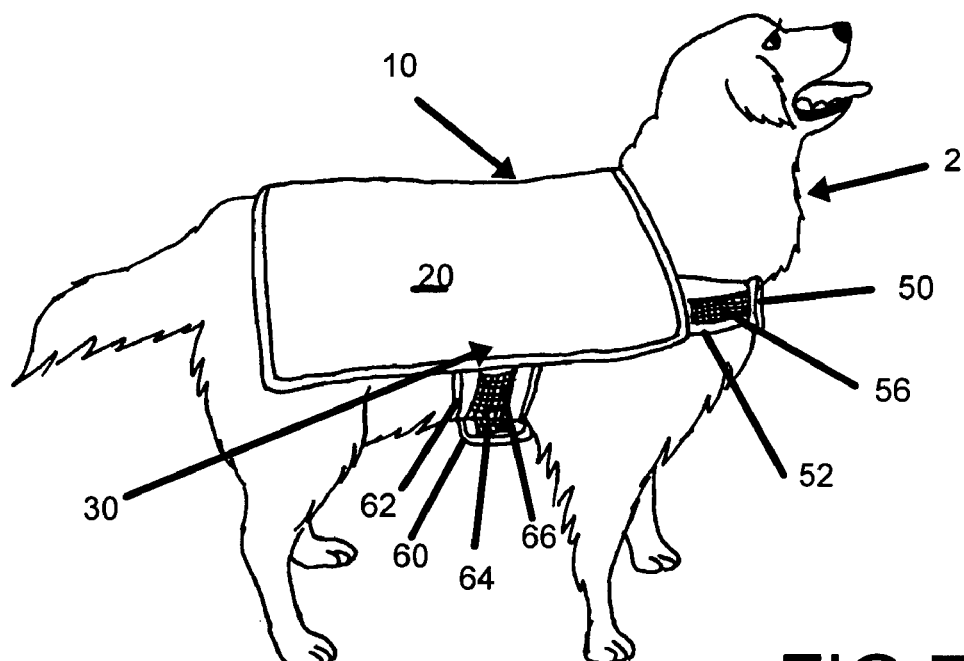
FIG. 7 is a view of the same golden retriever shown in FIGS. 4–6, in which a next smaller size coat is fitted to the same dog.

FIG. 7 shows the same Golden Retriever wearing a smaller size coat, in this case a Large coat. This demonstrates that size selection can be a matter of owner preference. If the owner prefers a fitting where the coat 10 does not come down as low towards the tail, for example if the dog is outside and will be sitting in a dusty area, or if they do not want the coat to touch the ground in the hind area while sitting, this smaller size may be more appropriate. Another reason for the smaller size is if the owner had a male dog and would prefer the stomach straps 60, 62 to be closer to the front of the dog 2 so that there is no chance of urine getting on the coat 10. Another reason for choosing the smaller size would be if you had a Golden Retriever or another dog that had a smaller chest. With this dog the coat 10 has a little less coverage and the chest straps 50, 52 would be a little higher on the chest, not as close to the top of the legs still staying very clear of the collar area and neck area, so the coat is still virtually unnoticed by the dog. The adjustability offered by the hook and loop fasteners is also demonstrated in this view. Another advantage offered by the hook and loop fastener strips is that the longitudinal position on the dog 2 can be varied, depending upon the size of the dog, the owner's preference or the precise position that is most comfortable to the dog. Since only a single stomach strap subassembly, using two mating straps 60, 62 are employed there will be no interference, which might result if front and back stomach or lower straps were employed.

Figure 8:
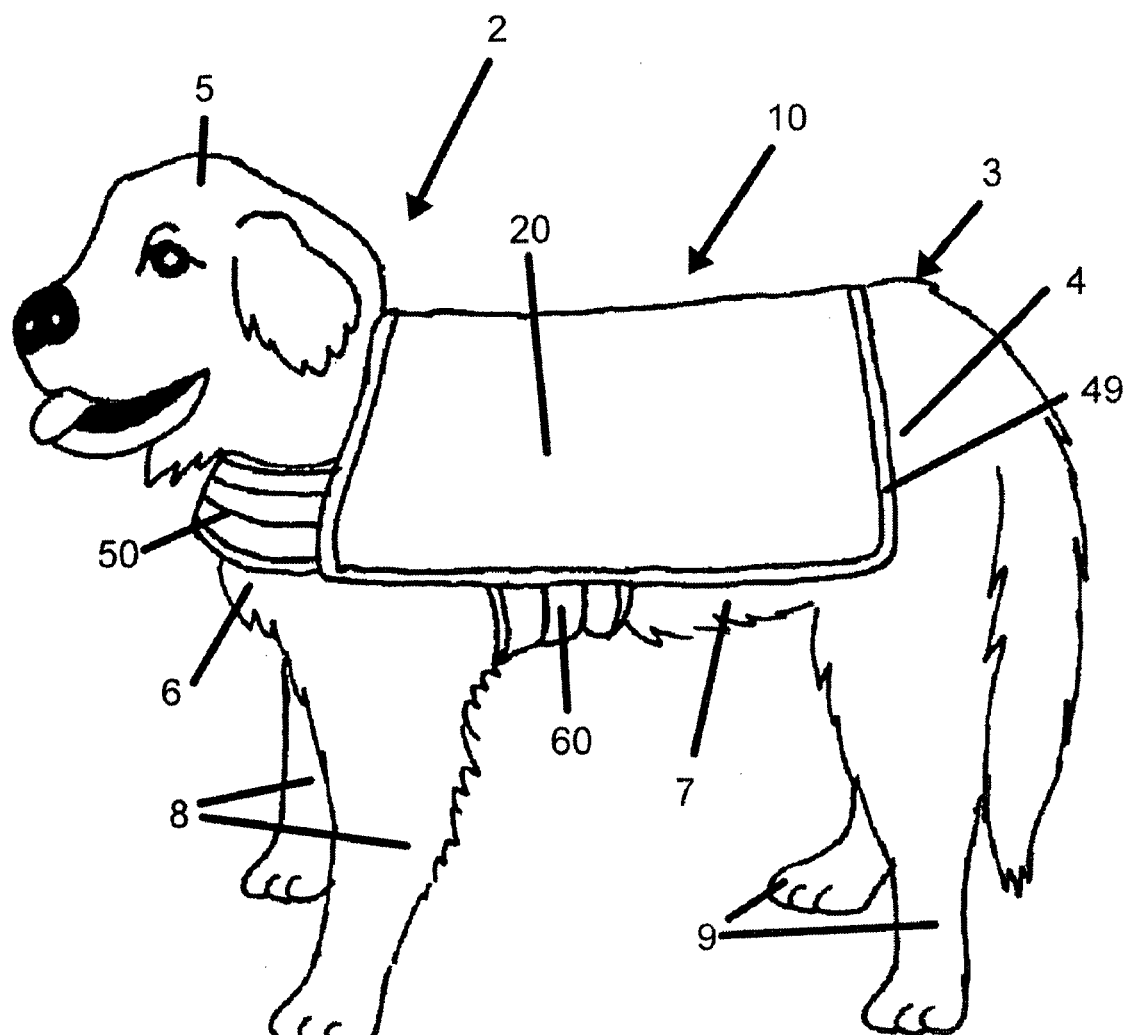
FIG. 8 is a view showing the fit of a dog coat of the same size as shown in FIGS. 4–6 on a larger dog, in this case a Saint Bernard.

The same X-large coat worn by a Golden Retriever in FIGS. 4–6 is worn by a much larger Saint Bernard in FIG. 8. A Saint Bernard is a much larger dog but because of the adjustability of the coat 10 the same size would fit a much larger dog.

Figure 9:
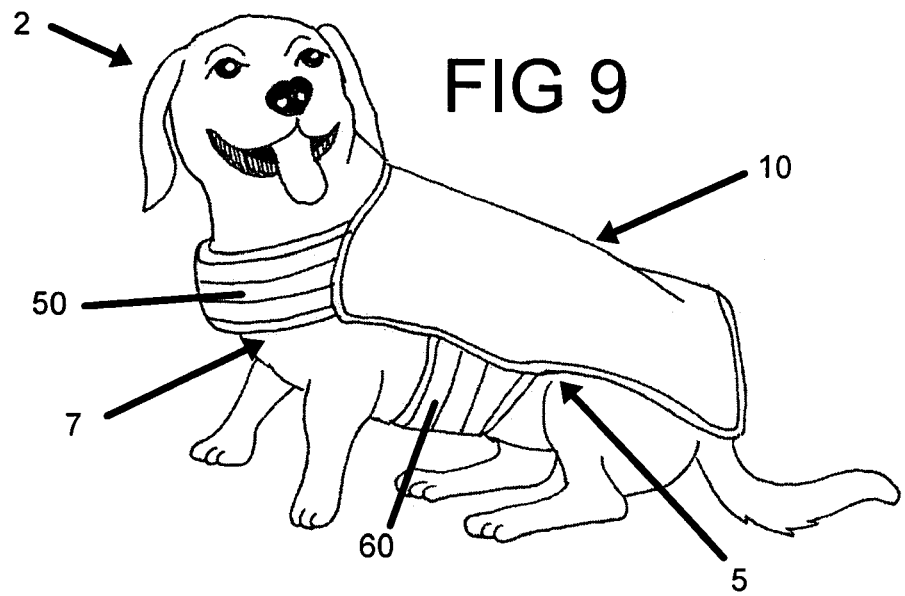
FIG. 9 is a view of another dog wearing a coat of the same size as the coat shown in FIG. 7, demonstrating how the coat can fit a mixed bread dog, which may not have a conformation typical of standard breed animals.

FIG. 9 shows that the coat 10 is also suitable for use by a dog having an unusual shape. The dog 2 shown in FIG. 9 is a mixed breed. This particular dog has a very large chest 7 and he is very low to the ground. He is also very thin and long. In FIG. 9, this dog is wearing a large coat 10. The coat 10 fits well across the chest, and it covers the full length of the dog to the base of the tail. The stomach straps 50, 52 are very wide but because they can be adjusted to fit flush against the skin there is still no problem of the coat getting wet when the dog is urinating. This particular dog is a male dog, and the coat fits quite well on him, without interfering with the genital area. If this same dog were to wear a Medium coat, the stomach straps 50, 52 would move up a few inches closer to the front of the body. This would be the choice if the owner preferred a fit that was even further from the genital area. This same dog could also wear a small coat that still fits him comfortably enough for the dog to sit.

Figure 10:
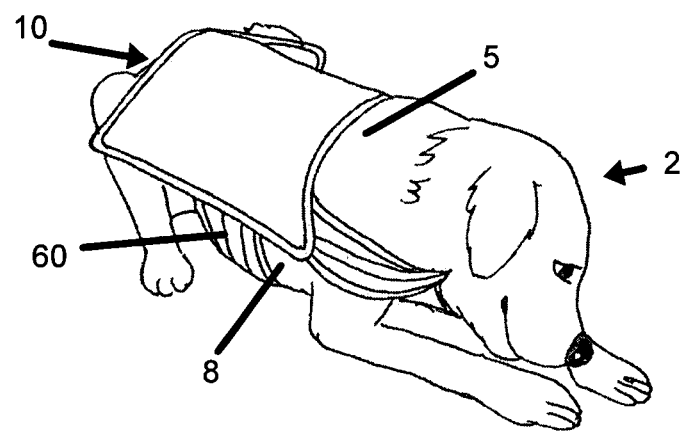
FIG. 10 is a view of a dog wearing a next smaller size coat.

FIG. 10 shows a dog wearing a medium coat, and demonstrates that the dog can comfortably lie down in the coat 10, with no pulling or tugging. The straps extending under his stomach still clear the back of the front legs and provide full coverage on the chest. This dog is a very tall dog but very, very thin. He is long enough that he can accommodate a nice wide stomach strap. He can wear three sizes. All three sizes fit well so the choice would be the preference of the owner.

Figure 11:
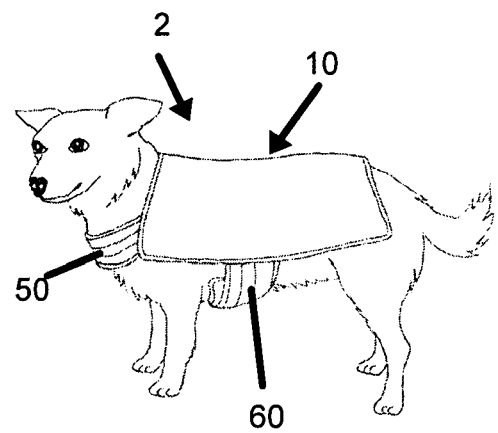
FIG. 11 is a view of a smaller dog wearing a smallest size coat fabricated in accordance with this invention.

FIG. 11 shows a much smaller dog wearing a small coat. In FIG. 11, the chest straps 50, 52 are tightened so that the coat 10 is higher and more forward on this dog's body. It doesn't reach the base of the tail but it is higher on the base of the neck. It is still very comfortable fit across the chest. The stomach straps move closer to the front of the body still clearing the back of the front legs. The same coat can be adjusted on the same dog to ride farther back on his body. The stomach straps in this picture covers more of the lower stomach where there usually less hair on it. The chest strap is opened up to slide the coat back, which gives more room around the neck area and covering more of the tail area.

In the preferred embodiment of this invention, two mating chest straps 50, 62 are employed, and two mating stomach or lower straps 60, 62 are employed. This is believed to be the better approach, but individual straps extending from one edge could be attached to mating hook or loop fasteners located on the body section 20 without departing from the broader aspects of this invention. This alternate embodiment, could however leave an end of the longer strap dangling, which would be less desirable.

Although the preferred embodiment is intended for use with a dog, alternate configurations could be fabricated for use with other four legged animals. For example, this invention could be employed to fabricate a horse blanket or coat. Therefore the embodiment of the invention depicted herein is merely representative of the invention defined by the following claims.

I claim:

1. A coat that can be lain over a four legged animal's torso and worn by the animal to limit the loss of body heat, the coat comprising:
    a body section formed of two layers of material;
    at least one chest strap extending from a front edge of the body section in a position to extend at least partially around the animal's chest beneath the animal's head adjacent the base of the animal's neck for securing the coat to the animal;
    at least one lower strap extending from a lower edge of the body section in a position to extend at least partially under the animal's torso for securing the coat to the animal; wherein
    a first end of each said at least one chest strap and a first end of each said at least one lower strap are sewn between the two layers forming the body section, the body section having a first seam extending partially around the body section and securing the straps to the body section, the first seam leaving an opening along one edge of the body section so that the body section can be turned inside out after each said at least one chest strap and each said at least one lower strap are sewn to the body section so that each said at least one chest strap and each said at least one lower strap are sewn to the inside of the two layers of the coat when finished, and the first seam forms a hidden seam after the two layers of the body section are reversed.

2. The coat of claim 1 including a second seam extending at least partially along said opening defined by the first seam along the one edge of the body section and a third seam extending around the body section, the third seam being inwardly spaced from edges of the body section to form a cord extending around the periphery of the body section.

3. The coat of claim 1 wherein two chest straps extend from a front edge of the body section, the two chest straps being mutually attachable and adjustable.

4. The coat of claim 1 wherein two lower straps extend from longitudinal side edges of the body section, the two lower straps being mutually attachable and adjustable.

5. The coat of claim 4 wherein the body section, each said at least one chest strap and each lower strap are fabricated from a cloth material.

6. The coat of claim 1 wherein a hook or loop fastener is sewn to each chest strap and each said at least one lower strap.

* * * * *